(12) United States Patent
Mahajan et al.

(10) Patent No.: US 12,196,564 B2
(45) Date of Patent: Jan. 14, 2025

(54) SYSTEMS AND METHODS FOR PROVIDING UNINTERRUPTED MEDIA CONTENT DURING VEHICLE NAVIGATION

(71) Applicant: Adeia Guides Inc., San Jose, CA (US)

(72) Inventors: Nishchit Mahajan, Punjab (IN); Ankur Aher, Maharashtra (IN)

(73) Assignee: Adeia Guides Inc., San Jose, CA (US)

( * ) Notice: Subject to any disclaimer, the term of this patent is extended or adjusted under 35 U.S.C. 154(b) by 405 days.

(21) Appl. No.: 17/732,084

(22) Filed: Apr. 28, 2022

(65) Prior Publication Data

US 2022/0252412 A1    Aug. 11, 2022

Related U.S. Application Data

(63) Continuation of application No. 16/557,925, filed on Aug. 30, 2019, now Pat. No. 11,340,085.

(51) Int. Cl.
*G01C 21/34* (2006.01)

(52) U.S. Cl.
CPC ..... *G01C 21/3453* (2013.01); *G01C 21/3415* (2013.01)

(58) Field of Classification Search
None
See application file for complete search history.

(56) References Cited

U.S. PATENT DOCUMENTS

| | | | |
|---|---|---|---|
| 8,990,848 B2* | 3/2015 | Basso | G06Q 30/02 725/32 |
| 9,528,850 B1* | 12/2016 | Hobbs | G01C 21/3682 |
| 9,739,622 B2* | 8/2017 | Yamashita | G01C 21/3484 |
| 11,248,927 B2 | 2/2022 | Mahajan et al. | |
| 2003/0128139 A1 | 7/2003 | Poltorak | |
| 2009/0100331 A1 | 4/2009 | Sauve et al. | |
| 2009/0100359 A1 | 4/2009 | Sauve et al. | |
| 2009/0100362 A1 | 4/2009 | Sauve et al. | |
| 2011/0301841 A1 | 12/2011 | Schuurbiers et al. | |
| 2011/0320021 A1 | 12/2011 | Tahara et al. | |
| 2013/0253833 A1* | 9/2013 | Tuukkanen | G06F 3/0481 701/538 |
| 2013/0308794 A1 | 11/2013 | Jochim et al. | |
| 2014/0201004 A1 | 7/2014 | Parundekar et al. | |
| 2016/0018235 A1* | 1/2016 | Azose | G01C 21/3629 701/428 |

(Continued)

OTHER PUBLICATIONS

"Fade Out Music During Navigation Voice", NPL, Reddit, Fade Out Music During Navigation Voice, (http://www.reddit.com/r/CarPlay/comments/aqq5av/fade_out_music_during_navigation_voice/) (Feb. 29, 2019).

(Continued)

*Primary Examiner* — Anshul Sood
(74) *Attorney, Agent, or Firm* — Haley Guiliano LLP

(57) ABSTRACT

Systems and methods are disclosed herein for selecting alternate routes with fewer directions during vehicle navigation. The disclosed techniques herein determine directions from route data and direction timestamps for each of the directions. For each direction, a corresponding media asset from media assets in a playlist having a media asset duration that matches a direction duration is determined. The direction duration is the time difference between the direction timestamp and a subsequent direction timestamp.

20 Claims, 8 Drawing Sheets

(56) References Cited

U.S. PATENT DOCUMENTS

| | | |
|---|---|---|
| 2016/0307154 A1 | 10/2016 | Moore et al. |
| 2016/0335564 A1 | 11/2016 | Downy et al. |
| 2016/0364770 A1 | 12/2016 | Denton et al. |
| 2017/0102866 A1 | 4/2017 | Calvillo et al. |
| 2017/0200197 A1 | 7/2017 | Brubaker |
| 2017/0202866 A1 | 7/2017 | Sampath |
| 2017/0213389 A1 | 7/2017 | Han et al. |
| 2017/0250896 A1 | 8/2017 | Punjani et al. |
| 2017/0292853 A1 | 10/2017 | Bostick et al. |
| 2018/0188054 A1 | 7/2018 | Kennedy et al. |
| 2018/0283891 A1 | 10/2018 | Andrew et al. |
| 2018/0335312 A1* | 11/2018 | Bennett .............. G01C 21/3629 |
| 2018/0347996 A1 | 12/2018 | Coleman et al. |
| 2018/0356237 A1 | 12/2018 | Abramson et al. |
| 2019/0074920 A1 | 3/2019 | Mackenzie et al. |
| 2019/0122457 A1 | 4/2019 | Andritsopoulos |
| 2019/0312941 A1 | 10/2019 | Maccini et al. |
| 2020/0007943 A1 | 1/2020 | Filmeyer |
| 2020/0134671 A1 | 4/2020 | Maccini et al. |
| 2020/0408538 A1 | 12/2020 | Raju et al. |
| 2021/0063177 A1 | 3/2021 | Mahajan et al. |
| 2021/0063193 A1 | 3/2021 | Mahajan et al. |
| 2021/0063194 A1 | 3/2021 | Mahajan et al. |
| 2021/0063569 A1 | 3/2021 | Crew et al. |

OTHER PUBLICATIONS

"Human Interface Guidelines", Apple Developer, Human Interface Guidelines, Audio, p. 1, (Jun. 18, 2018).

Jones, Matt, "Ontrack: Dynamically adapting music playback to support navigation", Jones, Matt, et al., Ontrack: Dynamically adapting music playback to support navigation, Pers Ubiquit Comput (2008) 12:513-525, DOI. 10.1007/s00779-007-0155-2 (http://link.springer.com/content/pdf/10.1007/s00779-007-0155-2.pdf.

\* cited by examiner

500

800

```
Start
  ↓
[802] Determine a plurality of travel routes from route data, wherein each of the plurality of travel routes has one or more directions
  ↓
[804] Determine a quickest route with the smallest travel duration from the plurality of travel routes
  ↓
[805] Determine whether an alternate route, different than the quickest route, from the plurality of travel routes has a travel duration matching the travel duration of the quickest route within a predefined time threshold
  ↓
[806] <alternate route matching quickest route within the predefined time threshold?>
  No → [807] Iterate to next alternate route → (back to 805)
  Yes ↓
[808] Determine whether the number of directions of the alternate route are fewer than the number of directions of the quickest route
  ↓
[810] <alternate route directions fewer than directions of the quickest route?>
  No → End
  Yes ↓
[812] Select the alternate route for navigation
  ↓
End
```

FIG. 8

SYSTEMS AND METHODS FOR PROVIDING UNINTERRUPTED MEDIA CONTENT DURING VEHICLE NAVIGATION

CROSS REFERENCE TO RELATED APPLICATIONS

This application is a continuation of U.S. patent application Ser. No. 16/557,925 (now allowed), filed Aug. 30, 2019. The disclosure of which is hereby incorporated herein in its entirety.

BACKGROUND

The present disclosure is directed to techniques for resolving overlapping audio in electronic devices, more particularly, providing uninterrupted media content during vehicle navigation.

SUMMARY

Navigation applications on electronic devices provide convenience to vehicle drivers by reciting audio commands of upcoming directions through the vehicle's audio system to aid in vehicle navigation. Concurrently, the driver, or other occupants of the vehicle, may be enjoying media content playing through the audio system of the vehicle. In this situation where media content is being played during engagement of the navigation system, there commonly arises conflict between two competing applications with overlapping audio output. One solution to prevent conflict between playback of the media content and the recitation of the navigation directions is to lower the volume of the media content and overlap the recitation of the navigation directions. This causes disturbance and frustration to some listeners, as in some instances, particular lyrics or musical motifs are compromised with the recitation of the navigation directions. It remains technically challenging to provide a solution which allows for recitation of the navigation directions and does not interrupt the media content in progress.

Accordingly, techniques are disclosed herein for selecting alternate routes with fewer directions during vehicle navigation. Some of the disclosed techniques herein disclose determining a plurality of travel routes from route data. Each of the plurality of travel routes has directions. A quickest route with the smallest travel duration from the plurality of travel routes is determined. A further determination is made whether an alternate route, different than the quickest route, from the plurality of travel routes has a travel duration which matches the travel duration of the quickest route within a predefined time threshold. In a positive determination, a determination is made whether the number of directions of the alternate route are fewer than the number of directions of the quickest route. If so, the alternate route is selected for navigation.

In some embodiments, determine directions from route data and direction timestamps for each of the directions. For each direction timestamp, a determination is made whether current playback of a media asset in a playlist ends within a predefined time threshold before the direction timestamp. In a positive determination, the playback of the playlist is paused until the direction timestamp has elapsed.

In some disclosed variants, a type of the media asset is determined from the plurality of media assets. A type specific time threshold value based on the type of the media asset is retrieved from the plurality of media assets. The type specific time threshold value is assigned to the predefined time threshold.

In other embodiments, technique disclose determining directions from route data and direction timestamps for each of the directions. For each direction, a corresponding media asset from media assets in a playlist having a media asset duration that matches a direction duration is determined. The direction duration is the time difference between the direction timestamp and a subsequent direction timestamp.

The techniques disclosed herein may be used as effective provision of recitation of navigation announcements which does not (or alternatively mitigates) interruption of media content.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which:

FIG. 8 is an illustrative flowchart of a process for providing uninterrupted media content during vehicle navigation utilizing an alternate route algorithm, in accordance with some embodiments of the disclosure.

DETAILED DESCRIPTION

Figure 1:
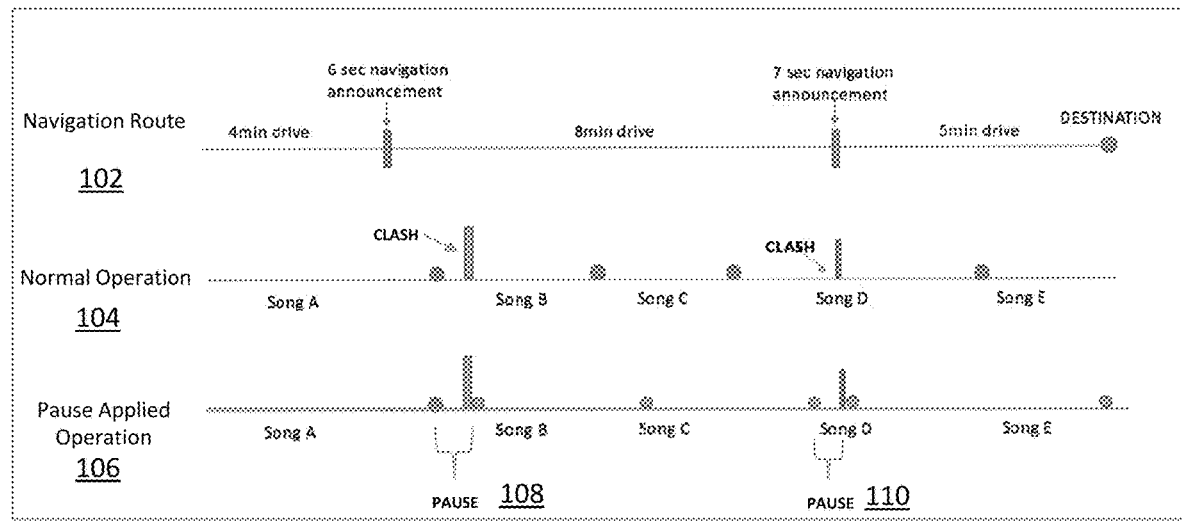
FIG. 1 shows an illustrative diagram of a navigation instruction timeline implementing a pause-based algorithm, in accordance with some embodiments of the disclosure.

FIG. 1 shows an illustrative diagram 100 of navigation instruction timeline implementing a pause-based algorithm, in accordance with some embodiments of the disclosure. In this example, a navigation route 102 is selected from a source to a destination. Within this navigation route, there are two navigation announcements after a four-minute duration from the source and a twelve-minute duration from the source (eight minutes from the commencement of the first navigation announcement).

Under normal operation 104, a processing engine may interface with a navigation system server and a media server to provide both navigation operations and media playback operations. In normal operation, there is a five songs playlist played back during the journey from source to destination, namely: song A, song B, song C, song D, and song E. In normal operation, the processing engine may playback the songs in sequential order as a normal playlist. Under this configuration, during the playback of song B, there is a clash as a navigation announcement is made during the playback of song B. There is also a second clash during the playback of song D, as a navigation announcement is made during the playback of song D. In this operation, the playback may not be desirable as there is overlapping audio playback from the media playback of songs B and D and multiple navigation announcements during playback of these songs.

Under a method for providing uninterrupted media content during vehicle navigation using a pause application 106, the processing engine may determine one or more directions from route data and one or more navigation announcements for each of the one or more directions. The processing engine may determine the route data by retrieving route data from a navigation system server. For example, the navigation system server may be a service accessed by a smartphone's processing engine via an application on the smartphone for navigation utilizing Global Positioning System (GPS). The navigation announcements may also be retrieved from a navigation system server. In some embodiments, the processing engine determines the navigation announcements based on real-time traffic conditions, weather, and other environmental factors. The processing engine may determine the navigation announcements continuously in real-time, at a predefined interval, or initially upon receipt of the route data.

The processing engine may, for each navigation announcement, determine whether current playback of a media asset from a plurality of media assets in a playlist ends within a predefined time threshold before the navigation announcement. The processing engine may retrieve media asset metadata from a media server. For example, the processing engine may be a mobile smartphone which, via an installed application, plays media assets via a streaming service. The application for streaming media on the mobile smartphone provides for access to a plurality of media assets (e.g., audio, video, live broadcast, music, movie, audio book, documentary, lecture, holographic media, 3D media, augmented reality media, and virtual reality media). In the current example, the streaming service may be a streaming music service which provides a playlist comprising five songs (e.g., songs A-E). The processing engine determines whether the duration of the song, from the songs A-E, end within a predefined time threshold before the navigation announcement.

In some embodiments, the predefined time threshold may be a value (e.g., two seconds, ten seconds, one minute, or two minutes). In other embodiments, the processing engine may receive a user instruction from an electronic device providing the predefined time threshold (e.g., a user provides the maximum threshold time value via smartphone input through a mobile GUI application and/or voice command). In yet other embodiments, the processing engine may determine a type of the media asset from the plurality of media assets. For example, if the type of media asset may a lecture. The processing engine may retrieve a type specific time threshold value based on the type of the media asset from the plurality of media assets. Continuing from the above example, given the type of media asset is a lecture, the retrieved type specific time threshold is higher than other assets set at five minutes. This may be because the lecture is a type of media asset in which interruptions are more severe than a conventional song, as a key concept may be compromised by overlapping audio. The processing engine may assign the type specific time threshold value to the predefined time threshold.

The processing engine may, for each navigation announcement, responsive to the determination that the current playback of the media asset from the plurality of media assets in the playlist ends within the predefined time threshold before the navigation announcement, pause playback of the playlist until the navigation announcement has elapsed. An embodiment of this application is shown in FIG. 1 at the pause operation applied at 106. In this operation, song A has completed, and the processing engine determines that the predefined time threshold of 10 seconds is met. The processing engine then pauses playback 108 of song B from the streaming service (e.g., media server) and allows the navigation announcement to occur without playback of any media asset, and upon completion of the navigation announcement, resumes playback of the playlist with song B. In similar fashion, the processing engine pauses playback 110 of song D to allow for the second navigation announcement.

In some embodiments, the processing engine may, responsive to pausing playback of the playlist until the navigation announcement has elapsed, generate for presentation an advertisement. The advertisement may be terminated upon elapse of the navigation announcement. For example, if the pause for playback is thirty sections, this pause may be filled with an advertisement. The advertisement may be received from the media server, the navigation system server, a third-party data structure, or the processing engine storage. The advertisement may be presented as audio, video, holographic media, 3D media, augmented reality media, or virtual reality media. Devices such as smartphones, personal computers, wearable devices, or other devices with embedded processing engines (or access to cloud-based processing engines) may playback these types of advertisements (e.g., holographic media, 3D media, augmented reality media, or virtual reality media).

In other embodiments, the processing engine may, determine locational information based on the one or more directions, and select an advertisement at least in part based on current locational information. For example, if the locational information for one or more directions is in the Marina district of San Francisco, CA, the advertisement may provide for local restaurants or tours to the Golden Gate bridge which is in close proximity.

In some embodiments, the processing engine may, responsive to pausing playback of the playlist until the navigation announcement has elapsed, generate for presentation auxiliary content. Auxiliary content may include weather updates, comedy skits and/or jokes, related content relating to the media asset being played, messages from a user's electronic device (e.g., voice notes, recitation of notifications/instant messages/text messages).

Figure 2:
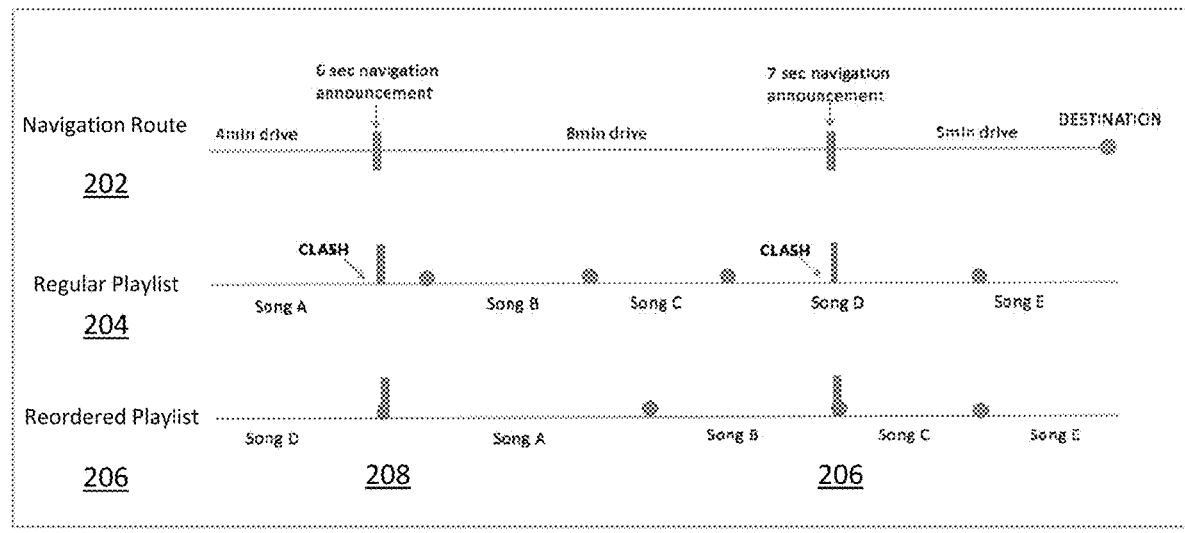
FIG. 2 shows an illustrative diagram of a navigation instruction timeline implementing a playlist reordering algorithm, in accordance with some embodiments of the disclosure.

FIG. 2 shows an illustrative diagram 200 of navigation instruction timeline implementing a playlist reordering algorithm, in accordance with some embodiments of the disclosure. Within this navigation route, there are two navigation announcements after a four-minute duration from the source and a twelve-minute duration from the source (eight minutes from the commencement of the first navigation announcement).

Under regular playlist operation 204, a processing engine may interface with a navigation system server and a media server to provide both navigation operations and media playback operations. In normal operation, there is a five songs playlist played back during the journey from source to destination, namely: song A, song B, song C, song D, and song E. In normal operation, the processing engine may playback the songs in sequential order as a normal playlist. Under this configuration, during the playback of song B, there is a clash as a navigation announcement is made during the playback of song B. There is also a second clash during the playback of song D, as a navigation announcement is made during the playback of song D. In this operation, the playback may not be desirable as there is overlapping audio playback from the media playback of songs B and D and multiple navigation announcements during playback of these songs.

Under a method for providing uninterrupted media content during vehicle navigation using a reordered playlist 206, the processing engine may determine one or more directions from route data and one or more navigation announcements for each of the one or more directions.

The processing engine may, for each direction, determine a corresponding media asset from a plurality of media assets in a playlist having a media asset duration that matches a direction duration. The direction duration is the time difference between the navigation announcement and a subsequent navigation announcement. The processing engine may retrieve media asset metadata from a media server. For example, the processing engine may be a mobile smartphone which, via an installed application, plays media assets via a streaming service. The application for streaming media on the mobile smartphone provides for access to a plurality of media assets (e.g., audio, video, live broadcast, music, movie, audio book, documentary, lecture, holographic media, 3D media, augmented reality media, and virtual reality media). In the current example, the streaming service may be a streaming music service which provides a playlist comprising five songs (e.g., songs A-E). The processing engine may query the media server for a media asset having a duration which matches the direction duration (e.g., four minutes). The processing engine may receive a media asset from the media server which matches the direction duration.

The processing engine may reorder the playlist based on the corresponding media assets for each of the one or more directions. Continuing from the example above, instead of the regular playlist order (listing as song A, song B, song C, song D, and song E), a reordered playlist is implemented (listing as song D, song A, song B, song C, and song E). As shown in FIG. 2, the end of song D 208 coincides with the navigation announcement. This is similar to the end of song B 210 coinciding with the second navigation announcement. In some embodiments, the playlist may be a list of preselected songs (e.g., preselection may be determined by a user and/or a list created by a third party, including computer generated). In other embodiments, the playlist may be generated by "auto-play" function which provides for media assets to automatically play sequentially after a selection of a selected media asset. This may be implemented for various types of media assets. For example, this function may be implemented for songs selected similar or random songs to follow a selected song. This function may also be implemented for audiobooks by selected the next chapter to follow a selected chapter.

In some embodiments, the processing engine may receive a list of preferred media assets. For example, the streaming service may provide a list of "favorites" relating to favorite songs selected by a user profile. The processing engine may determine whether the media asset duration of the corresponding media asset matches a media asset duration of a media asset from the list of preferred media assets. Continuing from the example above, the processing engine would determine whether one of the favorited songs has a song length which matches the media asset duration (which matches the direction duration). The processing engine may, responsive to the determination that the media asset duration of the corresponding media asset matches the media asset duration of the media asset from the list of preferred media assets, substitute the matching media asset from the list of preferred media assets for the corresponding media asset. Continuing from the above example, the favorited song having the matching song length duration is substituted for the media asset in the playlist which was to be reordered.

In some embodiments, the processing engine may determine if the number of the plurality of media assets in the playlist exceeds a predefined minimum playlist size. Responsive to the determination that the number of the plurality of media assets in the playlist does not exceed the predefined minimum playlist size, the processing engine may select a playlist from a plurality of playlists exceeding the predefined minimum playlist size. For example, there may be two playlists A and B, where playlist A includes eight media assets, while playlist B includes 230 media assets. If the minimum playlist size is 100, the processing engine will select playlist B. This provides for increased media asset selection to increase probability of determining a corresponding media asset from a plurality of media assets in a playlist having a media asset duration that matches a direction duration. In some embodiments, the predefined minimum playlist size is determined based at least in part on the number of the one or more directions. For example, the system may be configured to increase the playlist size if the number of directions is numerous. In some embodiments, a ratio may be implemented which may be proportional based on a predefined ratio value (e.g., thirty media assets per direction). In some embodiments, the ratio, or predefined minimum playlist size is provided by a media server.

In some embodiments, the selected playlist is received by a user input (via an electronic device such as a smartphone). In other embodiments, the selected playlist is selected from a list of preferred playlists of a user profile from the media server.

Figure 3:
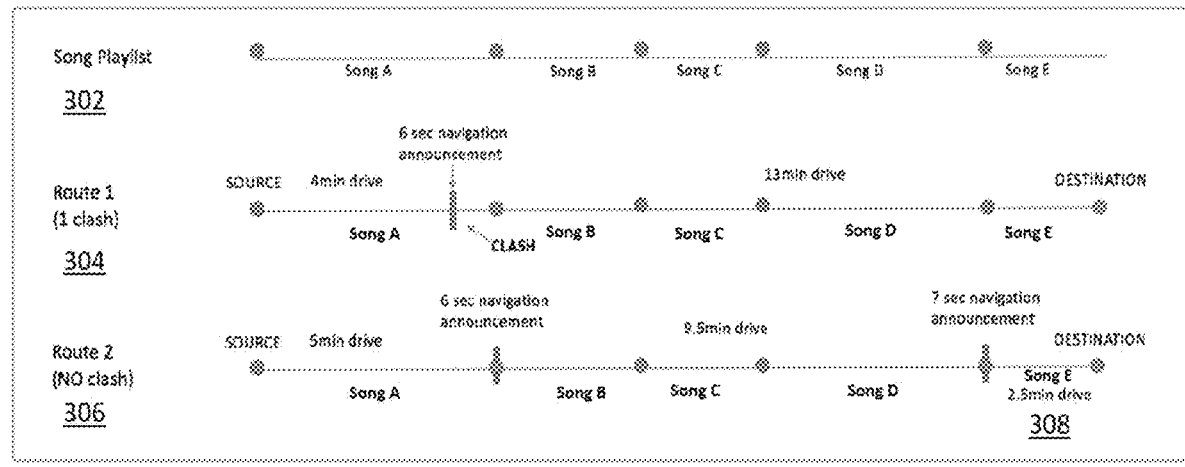
FIG. 3 shows an illustrative diagram of a navigation instruction timeline implementing an alternate route algorithm, in accordance with some embodiments of the disclosure.

FIG. 3 shows an illustrative diagram 300 of navigation instruction timeline implementing an alternate route algorithm, in accordance with some embodiments of the disclosure. There is a song playlist 302 including song A, song B, song C, song D, and song E. Under route 1 (304), there is a clash during playback of song A.

Implementing a method for providing uninterrupted media content during vehicle navigation using an alternate route 306, the processing engine may determine a plurality of travel routes from route data. Each of the plurality of travel routes has one or more directions. The processing engine may determine the route data by retrieving route data from a navigation system server. For example, the navigation system server may be a service accessed by a smartphone's processing engine via an application on the smartphone for navigation utilizing Global Positioning System (GPS).

The processing engine may determine a quickest route with the smallest travel duration from the plurality of travel routes. A further determination is made whether an alternate route, different than the quickest route, from the plurality of travel routes, has a travel duration matching the travel duration of the quickest route within a predefined time threshold. For example, the quickest route to a destination may be 24 minutes, with an alternate route to the destination having a 28 minute duration. If the predefined time threshold is five minutes, the alternate route matches the quickest route (within the threshold). In some embodiments, the predefined time threshold is provided by user input (via an electronic device such as a smartphone).

The processing engine may, in response to the determination that the alternate route has the travel duration matching the travel duration of the quickest route within the predefined time threshold, determine whether the number of directions of the alternate route are fewer than the number of directions of the quickest route. In response to the determination that the number of directions of the alternate route are fewer than the number of directions of the quickest route, the processing engine may select the alternate route for navigation. Continuing from the example above, if the 28-minute alternate route has five fewer direction than the quickest route, the alternate route will be selected. The fewer directions provide for fewer navigation announcements, and ultimately fewer interruptions to media playback. In some embodiments, the determining whether the number of directions of the alternate route are fewer than the number of directions of the quickest route comprises determining whether the number of directions of the alternate route is fewer than a minimum direction threshold. In other embodiments, the minimum direction threshold is set by user input (via an electronic device such as a smartphone).

In some embodiments, the processing engine determines an alternate route with directions having navigation announcements which overlap with the end of one or more media assets from a playlist. As seen in FIG. 3, at 306 there is no clash as both navigation announcements are directions as part of an alternate route which have timestamps which overlap with the end of song A and Song D respectively from the playlist includes songs A-E. The original route 1 (304) had directions including direction 1 having 4 minute duration and direction 2 having 13 minute duration. The alternate route, route 2, has directions including direction 1 having 5 minute duration, direction 2 having 9.5 minute duration, and direction 3 having 2.5 minute duration. In this manner, an alternate route is chosen which does not add any additional time (308), but does not have any interruptions.

In some embodiments, the processing engine receives appointment information comprising location and times for one or more appointments. The processing engine may determine whether a time difference between an estimated arrival time of the alternate route and a time for an appointment from the one or more appointments is within an appointment threshold. In response to the determination that the time difference between the estimated arrival time of the alternate route and the time for the appointment from the one or more appointments is within the appointment threshold, the processing engine may select another alternate route, different from the alternate route, from the plurality of travel routes. For example, if there is a doctor's appointment within one hour (e.g., appointment threshold) of the estimated arrival time for a destination, the system may cancel the alternate route and search for an additional alternate route which satisfies the criteria to lessen navigation announcement while fulfilling the predefined time threshold criteria. In some embodiments, the additional alternate route is the quickest route.

In some embodiments, the processing engine receives appointment information comprising location and times for one or more appointments. The processing engine may determine whether one of the one or more appointments has a high priority status. In response to the determination that the one of the one or more appointments has a high priority status, the processing engine may select another alternate route, different from the alternate route, from the plurality of travel routes.

Figure 4:
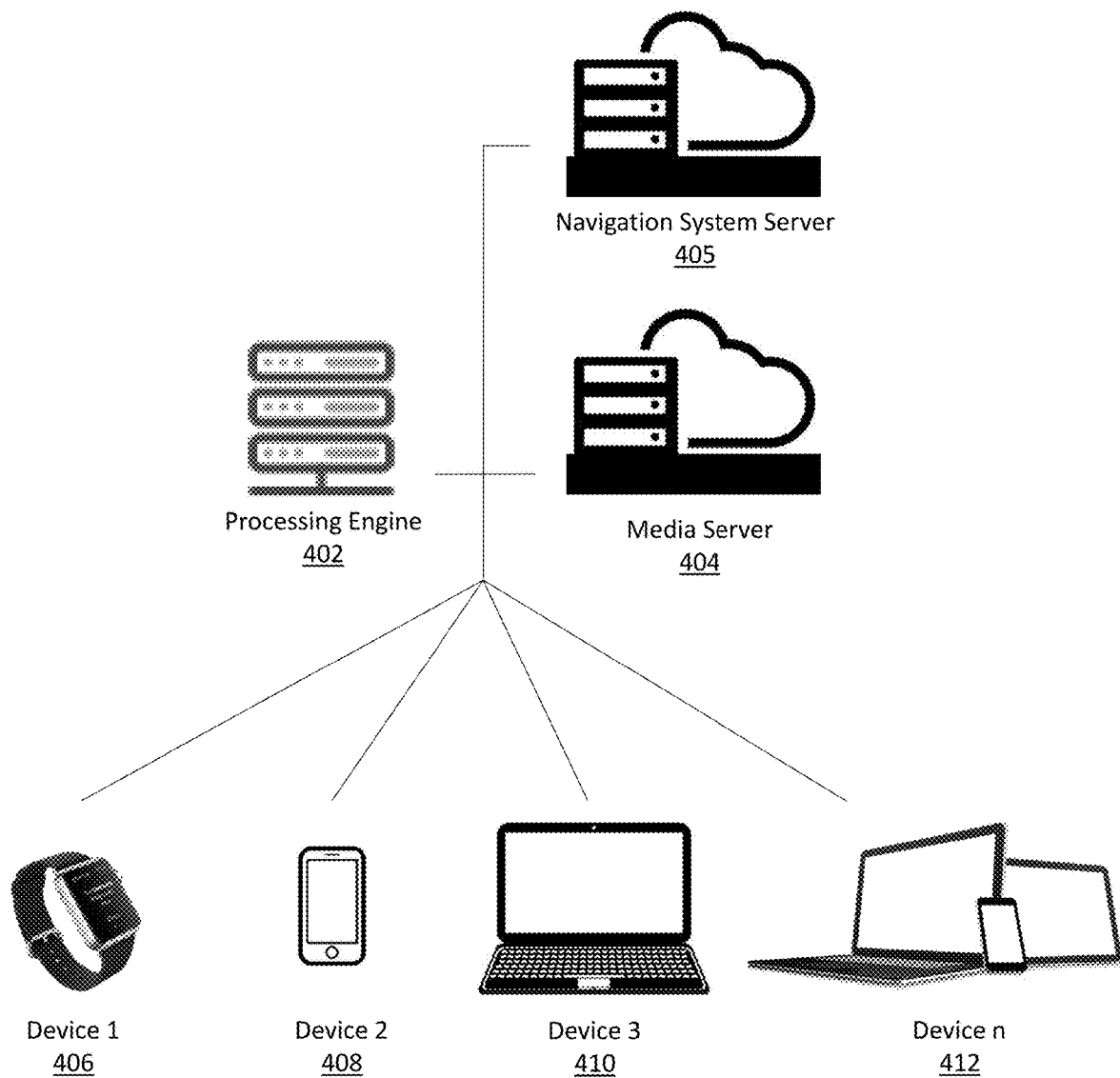
FIG. 4 shows an illustrative system diagram of the processing engine, media server, navigation system server, and electronic devices in accordance with some embodiments of the disclosure.
Figure 5:
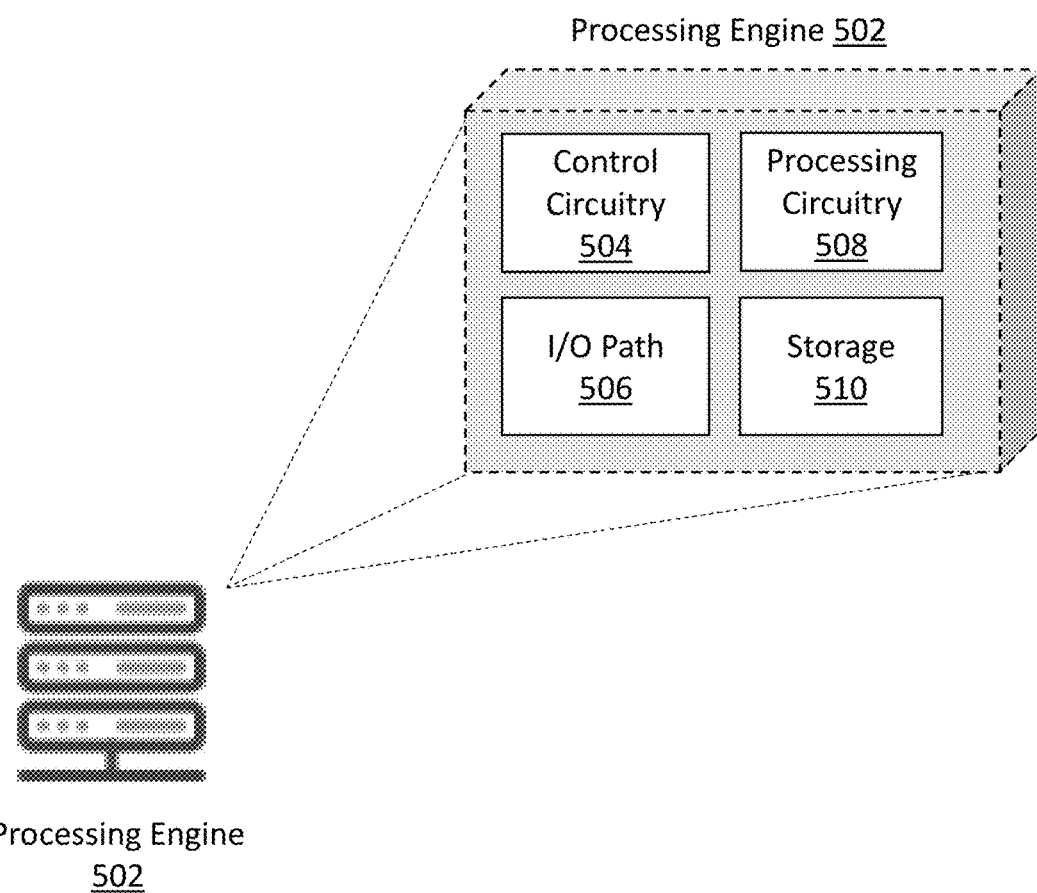
FIG. 5 shows an illustrative block diagram of the processing engine, in accordance with some embodiments of the disclosure.

FIG. 4 shows an illustrative system diagram 400 of the processing engine, media server, and navigation system server, and electronic devices in accordance with some embodiments of the disclosure. The processing engine 402 may be of any hardware that provides for processing and transmit/receive functionality. The processing engine may be communicatively coupled to multiple electronic devices (e.g., device 1 (406), device 2 (408), device 3 (410), and device n (412)), a media server 404, and a navigation system server 405. A further detailed disclosure on the processing engine can be seen in FIG. 5 showing an illustrative block diagram of the processing engine, in accordance with some embodiments of the disclosure.

In some embodiments, the processing engine may be implemented remote from the devices 406-412 such as from a cloud server configuration. The processing engine may be implemented by a vehicle infotainment system, vehicle entertainment system, a smartphone, a smartwatch, a smart wearable device, a Smart TV, a set-top box, an integrated receiver decoder (IRD) for handling satellite television, a digital storage device, a digital media receiver (DMR), a digital media adapter (DMA), a streaming media device, a local media server, a BLU-RAY player, a BLU-RAY recorder, a personal computer (PC), a smart-home personal assistant, a laptop computer, a tablet computer, a WebTV box, a personal computer television (PC/TV), a PC media server, a PC media center, a handheld computer, a personal digital assistant (PDA), a mobile telephone, a portable video player, a portable music player, a portable gaming machine, or any other television equipment, computing equipment, Internet-of-Things device, wearable device, or wireless device, and/or combination of the same. Any of the system modules (e.g., processing engine, media server, navigation system server, and electronic devices) may be any combination of shared or disparate hardware pieces that are communicatively coupled.

In some embodiments, the media server may be implemented remote from the electronic devices 406-412, navigation system server and the processing engine 402 such as a cloud server configuration. The media server may be any device interfacing with the processing engine for provision of media assets (e.g., audio content, video content, holographic content, or content for heads-up-display ("HUD")). In some embodiments, the media server provides the media assets via streaming format over a communication network (e.g., Internet, Bluetooth, NFC, auxiliary cord, USB interface, or similar). In some embodiments, the media server provides permissions for a user account to access media assets on local storage. The media server may be implemented by remote servers, remote databases, a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a personal computer television (PC/TV), a PC media server, a PC media center, a handheld computer, a personal digital assistant (PDA), a mobile telephone, a portable video player, a portable music player, a portable gaming machine, or any other television equipment, computing equipment, Internet-of-Things device, wearable device, or wireless device, and/or combination of the same.

In some embodiments, the navigation system server may be implemented remote from the electronic devices 406-412, media server 404 and the processing engine 402 such as a cloud server configuration. The navigation system server may be any device interfacing with the processing engine for provision of route data, navigation information, and/or directions. In some embodiments, the navigation system server provides the information over a communication network (e.g., Internet, Bluetooth, NFC, auxiliary cord, USB interface, or similar). The navigation system server may be implemented by a vehicle infotainment system, a vehicle entertainment system, a vehicle navigation system, a stand-alone navigation system, a smartphone, a smartwatch, a digital storage device, a digital media receiver (DMR), a digital media adapter (DMA), a streaming media device, a personal computer (PC), a laptop computer, a tablet computer, a personal computer television (PC/TV), a PC media server, a PC media center, a handheld computer, a personal digital assistant (PDA), a portable video player, a portable music player, a portable gaming machine, or any other entertainment equipment, computing equipment, Internet-of-Things device, wearable device, or wireless device, and/or combination of the same.

In some embodiments, the processing engine, media server, navigation system server, and a device from devices 406-412 may be implemented within a single local device. In other embodiments, the processing engine and streaming service server may be implemented within a single local device.

The electronic devices (e.g., device 1 (406), device 2 (408), device 3 (410), and device n (412)), may be any device that has properties to transmit/receive network data as well as an interface to output route data and navigation directions, and/or play media assets. The devices 406-412 may be implemented by a vehicle infotainment system, vehicle entertainment system, a vehicle navigation system, a smartphone, a smartwatch, a smart wearable device, a Smart TV, a set-top box, an integrated receiver decoder (IRD) for handling satellite television, a digital storage device, a digital media receiver (DMR), a digital media adapter (DMA), a streaming media device, a local media server, a BLU-RAY player, a BLU-RAY recorder, a personal computer (PC), a smart-home personal assistant, a laptop computer, a tablet computer, a WebTV box, a personal computer television (PC/TV), a PC media server, a PC media center, a handheld computer, a personal digital assistant (PDA), a mobile telephone, a portable video player, a portable music player, a portable gaming machine, or any other television equipment, computing equipment, Internet-of-Things device, wearable device, or wireless device, and/or combination of the same.

FIG. 5 shows an illustrative block diagram 500 of the processing engine, in accordance with some embodiments of the disclosure. In some embodiments, the processing engine may be communicatively connected to a user interface. In some embodiments, the processing engine may include processing circuitry, control circuitry, and storage (e.g., RAM, ROM, hard disk, removable disk, etc.). The processing engine may include an input/output path 506. I/O path 506 may provide device information, or other data, over a local area network (LAN) or wide area network (WAN), and/or other content and data to control circuitry 504, that includes processing circuitry 508 and storage 510. Control circuitry 504 may be used to send and receive commands, requests, signals (digital and analog), and other suitable data using I/O path 506. I/O path 506 may connect control circuitry 504 (and specifically processing circuitry 508) to one or more communications paths.

Control circuitry 504 may be based on any suitable processing circuitry such as processing circuitry 508. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g. two Intel Core i7 processors) or multiple different processors (e.g., an Intel Core i5 processor and an Intel Core i7 processor). In some embodiments, control circuitry 504 executes instructions for a processing engine stored in memory (e.g., storage 510).

Memory may be an electronic storage device provided as storage 510, which is part of control circuitry 504. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions).

The processing engine 502 may be coupled to a communications network. The communication network may be one or more networks including the Internet, a mobile phone network, mobile voice or data network (e.g., a 5G, 4G or LTE network), mesh network, peer-to-peer network, cable network, or other types of communications network or combinations of communications networks. The processing engine may be coupled to a secondary communication network (e.g., Bluetooth, Near Field Communication, service provider proprietary networks, or wired connection) to the selected device for generation for playback. Paths may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths.

Figure 6:
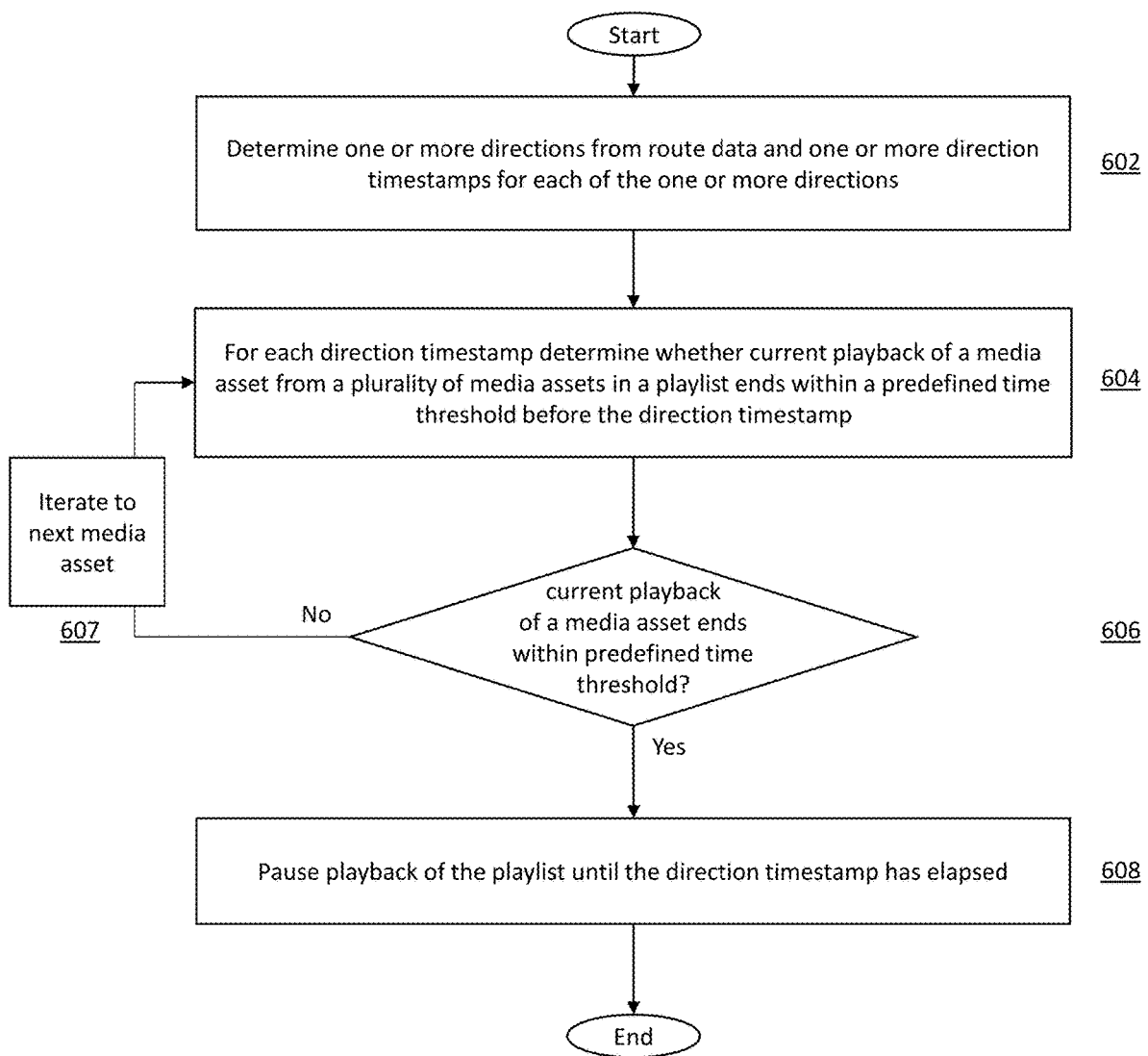
FIG. 6 is an illustrative flowchart of a process for providing uninterrupted media content during vehicle navigation utilizing a pause algorithm, in accordance with some embodiments of the disclosure.

FIG. 6 is an illustrative flowchart of a process for providing uninterrupted media content during vehicle navigation utilizing a pause algorithm, in accordance with some embodiments of the disclosure. Process 600, and any of the following processes, may be executed by control circuitry 504 (e.g., in a manner instructed to control circuitry 504 by the processing engine 502). Control circuitry 504 may be part of a processing engine, or of a remote server separated from the processing engine by way of a communication network, or distributed over a combination of both.

At 602, the processing engine 502, by control circuitry 504, determines one or more directions from route data and one or more navigation announcements for each of the one or more directions. In some embodiments, the processing engine receives the route data from the navigation system server 405 via the I/O path 506 regarding the media asset viewed by the user. In other embodiments, the processing engine 502 is embedded on an electronic device 406-412. In some embodiments, determining the one or more directions from route data and one or more navigation announcements for each of the one or more directions is performed, at least in part, by processing circuitry 508.

At 604, the processing engine 502, by control circuitry 504, for each navigation announcement, determines whether current playback of a media asset from a plurality of media assets in a playlist ends within a predefined time threshold before the navigation announcement. In some embodiments, the plurality of media assets is received from a media server 404 via the VO path 506. In some embodiments, determining whether current playback of a media asset from a plurality of media assets in a playlist ends within a predefined time threshold before the navigation announcement is performed, at least in part, by processing circuitry 508. If, at 606, control circuitry determines "No," the current playback of a media asset from a plurality of media assets in a playlist does not end within a predefined time threshold before the navigation announcement, the process reverts to 607. At 607, the processing engine 502, by control circuitry 504, iterates to the next media asset from the plurality of assets and reverts to step 604.

If, at 606, control circuitry determines "Yes," the current playback of a media asset from a plurality of media assets in a playlist ends within a predefined time threshold before the navigation announcement, the process advances to 608. At 608, the processing engine 502, by control circuitry 504, for each navigation announcement, pauses playback of the playlist until the navigation announcement has elapsed. In some embodiments, the processing engine 502, by control circuitry 504, sends a pause instruction via the I/O path 506 to the media asset from a media server 404.

In some embodiments, the processing engine 502, by control circuitry 504, determines a type of the media asset from the plurality of media assets. The processing engine 502, by control circuitry 504 retrieves a type specific time threshold value based on the type of the media asset from the plurality of media assets. In some embodiments, the processing engine 502, by control circuitry 504, retrieves a type specific time threshold value from a media server 404 via the I/O path 506. The processing engine 502, by control circuitry 504 assigns the type specific time threshold value to the predefined time threshold. In some embodiments, the processing engine 502, by control circuitry 504 stores the assignment in storage 510.

In some embodiments, the processing engine 502, by control circuitry 504, responsive to pausing playback of the playlist until the navigation announcement has elapsed, generates for presentation an advertisement. In some embodiments, the processing engine 502, by control circuitry 504 may generates an instruction for presentation of the advertisement to the devices 406-412. In other embodiments, the processing engine 502, by control circuitry 504, determines locational information based on the one or more directions. The directions may be accessed from the navigation system server 405 via the I/O path 506. The processing engine 502, by control circuitry 504, selects an advertisement at least in part based on current locational information. In some embodiments, the processing engine 502, by control circuitry 504, sends an instruction for advertisement selection via the I/O path 506 to the devices 406-412.

Figure 7:
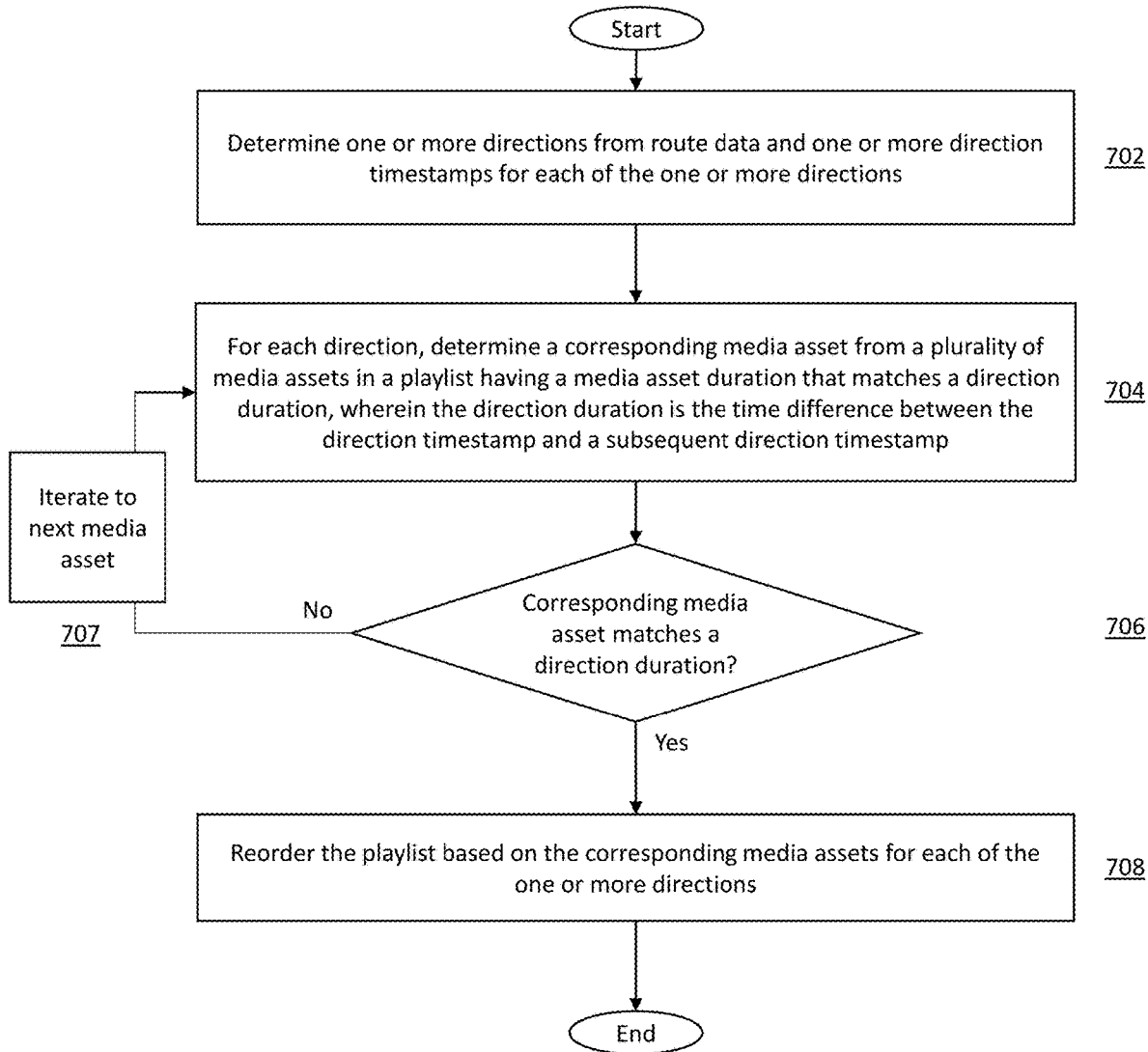
FIG. 7 is an illustrative flowchart of a process for providing uninterrupted media content during vehicle navigation utilizing a playlist reordering algorithm, in accordance with some embodiments of the disclosure.

FIG. 7 is an illustrative flowchart of a process 700 for providing uninterrupted media content during vehicle navigation utilizing a playlist reordering algorithm, in accordance with some embodiments of the disclosure. At 702, the processing engine 502, by control circuitry 504, determines one or more directions from route data and one or more navigation announcements for each of the one or more directions. In some embodiments, the processing engine receives the route data from the navigation system server 405 via the I/O path 506 regarding the media asset viewed by the user. In other embodiments, the processing engine 502 is embedded on an electronic device 406-412. In some embodiments, determining the one or more directions from route data and one or more navigation announcements for each of the one or more directions is performed, at least in part, by processing circuitry 508.

At 704, the processing engine 502, by control circuitry 504, for each navigation announcement, determining a corresponding media asset from a plurality of media assets in a playlist having a media asset duration that matches a direction duration. The direction duration is the time difference between the navigation announcement and a subsequent navigation announcement. In some embodiments, the plurality of media assets is received from a media server 404 via the I/O path 506. In some embodiments, determining a corresponding media asset from a plurality of media assets in a playlist having a media asset duration that matches a direction duration is performed, at least in part, by processing circuitry 508. If, at 706, control circuitry determines "No," the corresponding media asset from a plurality of media assets in a playlist having a media asset duration does not match a direction duration, the process reverts to 707. At 707, the processing engine 502, by control circuitry 504, iterates to the next media asset from the plurality of assets and reverts to step 704.

If, at 706, control circuitry determines "Yes," the corresponding media asset from a plurality of media assets in a playlist having a media asset duration matches a direction duration, the process advances to 708. At 708, the processing engine 502, by control circuitry 504, reorders the playlist based on the corresponding media assets for each of the one or more directions. In some embodiments, the processing engine 502, by control circuitry 504, sends a reordering instruction via the I/O path 506 to the media asset from a media server 404.

In some embodiments, the processing engine 502, by control circuitry 504, receives a list of preferred media assets. The list of preferred media assets is received from a media server 404 via the I/O path 506. The processing engine 502, by control circuitry 504, determines whether the media asset duration of the corresponding media asset matches a media asset duration of a media asset from the list of preferred media assets. Responsive to the determination that the media asset duration of the corresponding media asset matches the media asset duration of the media asset from the list of preferred media assets, the processing engine 502, by control circuitry 504, substitutes the matching media asset from the list of preferred media assets for the corresponding media asset.

In some embodiments, the processing engine 502, by control circuitry 504, determines if the number of the plurality of media assets in the playlist exceeds a predefined minimum playlist size. The playlist is received from a media server 404 via the I/O path 506. Responsive to the determination that the number of the plurality of media assets in the playlist does not exceed the predefined minimum playlist size, the processing engine 502, by control circuitry 504, selects a playlist from a plurality of playlists exceeding the predefined minimum playlist size. In some embodiments, the processing engine 502, by control circuitry 504, sends an instruction for playlist selection via the I/O path 506 to the devices 406-412.

FIG. 8 is an illustrative flowchart of a process 800 for providing uninterrupted media content during vehicle navigation utilizing an alternate route algorithm, in accordance with some embodiments of the disclosure. At 802, the processing engine 502, by control circuitry 504, determines a plurality of travel routes from route data. Each of the plurality of travel routes has one or more directions. In some embodiments, the processing engine receives the route data from the navigation system server 405 via the I/O path 506 regarding the media asset viewed by the user. In other embodiments, the processing engine 502 is embedded on an electronic device 406-412. In some embodiments, determining the plurality of travel routes from route data is performed, at least in part, by processing circuitry 508.

At 804, the processing engine 502, by control circuitry 504, for each navigation announcement, determining a quickest route with the smallest travel duration from the plurality of travel routes. In some embodiments, determining the quickest route with the smallest travel duration from the plurality of travel routes is performed, at least in part, by processing circuitry 508.

At 805, the processing engine 502, by control circuitry 504, for each navigation announcement, determining whether an alternate route, different than the quickest route, from the plurality of travel routes has a travel duration matching the travel duration of the quickest route within a predefined time threshold. In some embodiments, determining the alternate route is performed, at least in part, by processing circuitry 508. If, at 806, control circuitry determines "No," the alternate route, different than the quickest route, from the plurality of travel routes has a travel duration that does not match the travel duration of the quickest route within a predefined time threshold, the process reverts to 807. At 807, the processing engine 502, by control circuitry 504, iterates to the next alternate route and reverts to step 805.

If, at 806, control circuitry determines "Yes," the alternate route, different than the quickest route, from the plurality of travel routes has a travel duration matches the travel duration of the quickest route within a predefined time threshold, the process advances to 808. At 808, the processing engine 502, by control circuitry 504, determines whether the number of directions of the alternate route are fewer than the number of directions of the quickest route. In some embodiments, determining whether the number of directions of the alternate route are fewer than the number of directions of the quickest route is performed, at least in part, by processing circuitry 508. If, at 810, control circuitry determines "No," the number of directions of the alternate route are not fewer than the number of directions of the quickest route, the process advances to END.

If, at 810, control circuitry determines "Yes," the number of directions of the alternate route are fewer than the number of directions of the quickest route, the process advances to 812. At 812, the processing engine 502, by control circuitry 504, selects the alternate route for navigation. In some embodiments, the processing engine 502, by control circuitry 504, sends a selection instruction to the navigation system server 405 via the I/O path 506.

In some embodiments, the processing engine 502, by control circuitry 504, receives appointment information comprising location and times for one or more appointments. The appointment information is received from devices 406-412 404 via the I/O path 506. The processing engine 502, by control circuitry 504, determines whether a time difference between an estimated arrival time of the alternate route and a time for an appointment from the one or more appointments is within an appointment threshold. In response to the determination that the time difference between the estimated arrival time of the alternate route and the time for the appointment from the one or more appointments is within the appointment threshold, the processing engine 502, by control circuitry 504, selects another alternate route, different from the alternate route, from the plurality of travel routes.

In some embodiments, the processing engine 502, by control circuitry 504, receives appointment information comprising location and times for one or more appointments. The appointment information is received from devices 406-412 404 via the I/O path 506. The processing engine 502, by control circuitry 504, determines whether one of the one or more appointments has a high priority status. In response to the determination that the one of the one or more appointments has a high priority status, the processing engine 502, by control circuitry 504, selects another alternate route, different from the alternate route, from the plurality of travel routes.

It is contemplated that some suitable steps or suitable descriptions of FIGS. 6-8 may be used with other suitable embodiment of this disclosure. In addition, some suitable steps and descriptions described in relation to FIGS. 6-8 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 4-5 could be used to perform one or more of the steps in FIGS. 6-8.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for selecting alternate routes with fewer interruptions during vehicle navigation, the method comprising:

determining a first and a second travel route from route data, wherein the first and the second travel route have a same start and end destination and the first and second travel routes each have one or more directions where the each one or more directions are associated with a navigation announcement;

receiving a preferred playlist having a plurality of media assets for playing during the first or the second travel route; and in response to receiving the preferred playlist:
determining timestamps of each the navigation announcement for the first and the second travel route;

determining whether the timestamps for the first and the second travel route overlap a media asset, from the plurality of media assets; and in response to determining that the timestamps for the first travel route overlap the media asset and that the timestmp for the second travel route do not overlap the media asset, selecting the second travel route as an alternate route for vehicle navigation.

2. The method of claim 1, further comprising, selecting the second travel route as the alternate route for vehicle navigation if the second travel route does not require more time to reach the end destination than the first travel route.

3. The method of claim 1, further comprising, selecting the second travel route as the alternate route for vehicle navigation if the second travel route adds additional time to reach the end destination than the first travel route, wherein the additional time added is within a predetermined threshold of the time to reach a end destination if the first travel route is used.

4. The method of claim 1, wherein a type of the media asset is at least one of audio, video, live broadcast, music, movie, audio book, documentary, lecture, holographic media, 3D media, augmented reality media, or virtual reality media.

5. The method of claim 1, wherein the route data is received from a navigation application.

6. The method of claim 1, wherein receiving the preferred playlist further comprises:
  accessing a user profile of a user that will be travelling on the first and the second travel route; and
  determining the preferred playlist based on a list of favorites in the user profile.

7. The method of claim 1, wherein determining whether the timestamps for the first and the second travel route overlap the media asset, further comprises determining whether an end of the media asset overlaps with the navigation announcement.

8. A system for selecting alternate routes with fewer interruptions during vehicle navigation, the system comprising:
  memory configured to store route data; and
  control circuitry configured to:
    determine a first and a second travel route from the route data, wherein the first and the second travel route have a same start and end destination and the first and second travel route each have one or more directions where the each one or more directions are associated with a navigation announcement;
    receive a preferred playlist having a plurality of media assets for playing during the first or the second travel route; and
    in response to receiving the preferred playlist:
      determine timestamps of each the navigation announcement for the first and the second travel route;
      determine whether the timestamps for the first and the second travel route overlap a media asset, from the plurality of media assets; and
      in response to determining that the timestamps for the first travel route overlap the media asset and that the timestamp for the second travel route do not overlap the media asset, , select the second travel route as an alternate route for vehicle navigation.

9. The system of claim 8, further comprising, the control circuitry configured to select the second travel route as the alternate route for vehicle navigation if the second travel route does not require more time to reach the end destination that the first travel route.

10. A system of claim 8, further comprising, the control circuitry configured to select the second travel route as the alternate route for vehicle navigation if the second travel route adds additional time to reach the end destination than the first travel route, wherein the additional time added is within a predetermined threshold of the time to reach a end destination if the first travel route is used.

11. The system of claim 8, wherein a type of the media asset is at least one of audio, video, live broadcast, music, movie, audio book, documentary, lecture, holographic media, 3D media, augmented reality media, or virtual reality media.

12. The system of claim 8, wherein the route data is received by the control circuitry from a navigation application.

13. The system of claim 8, wherein receiving the preferred playlist further comprises, the control circuitry configured to:
  access a user profile of a user that will be travelling on the first and the second travel route; and
  determine the preferred playlist based on a list of favorites in the user profile.

14. The system of claim 8, wherein determining whether the timestamps for the first and the second travel route overlap the media asset, further comprises, the control circuitry configured to determine whether an end of the media asset overlaps with the navigation announcement.

15. A non-transitory computer-readable medium having instructions encoded thereon, that when executed by control circuitry causes the control circuitry to:
  determining a first and a second travel route from route data, wherein the first and the second travel route have a same start and end destination and the first and second travel routes each have one or more directions where the each one or more directions are associated with a navigation announcement;
  receiving a preferred playlist having a plurality of media assets for playing during the first or the second travel route; and
  in response to receiving the preferred playlist:
  determining timestamps of each the navigation announcement for the first and the second travel route;
  determining whether the timestamps for the first and the second travel route overlap a media asset, from the plurality of media assets; and
    in response to determining that the timestamps for the first travel route overlap the media asset and that the timestamps for the second travel route do not overlap the media asset, selecting the second travel route as an alternate route for vehicle navigation.

16. The non-transitory computer-readable medium of claim 15, wherein the instructions further cause the control circuitry to select the second travel route as the alternate route for vehicle navigation if the second travel route does not require more time to reach the end destination that the first travel route.

17. The non-transitory computer-readable medium of claim 15, wherein the instructions further cause the control circuitry to select the second travel route as the alternate route for vehicle navigation if the second travel route adds additional time to reach the end destination than the first travel route, wherein the additional time added is within a predetermined threshold of a time to reach the end destination if the first travel route is used.

18. The non-transitory computer-readable medium of claim 15, wherein a type of the media asset is at least one of audio, video, live broadcast, music, movie, audio book, documentary, lecture, holographic media, 3D media, augmented reality media, or virtual reality media.

19. The non-transitory computer-readable medium of claim 15, wherein the instructions further cause the control circuitry to:
- access a user profile of a user that will be travelling on the first and the second travel route; and
- determine the preferred playlist based on a list of favorites in the user profile.

20. The non-transitory computer-readable medium of claim 15, wherein determining whether the timestamps for the first and the second travel route overlap the media asset, further comprises, the instructions causing the control circuitry to determine whether an end of the media asset overlaps with the navigation announcement.

* * * * *

UNITED STATES PATENT AND TRADEMARK OFFICE
CERTIFICATE OF CORRECTION

PATENT NO. : 12,196,564 B2  
APPLICATION NO. : 17/732084  
DATED : January 14, 2025  
INVENTOR(S) : Mahajan et al.

Page 1 of 1

It is certified that error appears in the above-identified patent and that said Letters Patent is hereby corrected as shown below:

In the Claims

In Claim 1, Column 15, Line 6, please delete "timestmp" and insert --timestamps--.

In Claim 3, Column 15, Line 19, please delete "of the time" and insert --of a time--.

In Claim 3, Column 15, Line 19, please delete "a end" and insert --the end--.

In Claim 8, Column 15, Line 63, please delete "asset, ," and insert --asset,--.

In Claim 10, Column 16, Line 9, please delete "of the time" and insert --of a time--.

In Claim 10, Column 16, Line 9, please delete "a end" and insert --the end--.

Signed and Sealed this  
Fifteenth Day of July, 2025

Coke Morgan Stewart  
*Acting Director of the United States Patent and Trademark Office*